US008270031B2

(12) United States Patent
Mitchell et al.

(10) Patent No.: US 8,270,031 B2
(45) Date of Patent: Sep. 18, 2012

(54) HALFTONE MECHANISM (75) Inventors: Joan L. Mitchell, Longmont, CO (US);
Nenad Rijavec, Longmont, CO (US)

(73) Assignee: InfoPrint Solutions Company, LLC, Boulder, CO (US)

( * ) Notice: Subject to any disclaimer, the term of this patent is extended or adjusted under 35 U.S.C. 154(b) by 925 days.

(21) Appl. No.: 12/350,555

(22) Filed: Jan. 8, 2009

(65) Prior Publication Data
US 2010/0171989 A1  Jul. 8, 2010

(51) Int. Cl.
G06K 15/00 (2006.01)
(52) U.S. Cl. ............ 358/3.14; 358/3.03; 358/3.06; 358/3.09; 358/534; 358/536
(58) Field of Classification Search .......... None
See application file for complete search history.

(56) References Cited

U.S. PATENT DOCUMENTS

| | | | | |
|---|---|---|---|---|
| 6,288,795 | B1* | 9/2001 | Urasawa | 358/3.09 |
| 6,956,670 | B1* | 10/2005 | Dittrich et al. | 358/1.9 |
| RE39,237 | E * | 8/2006 | Cho et al. | 382/300 |
| 7,224,488 | B2 | 5/2007 | Inoue | |
| 7,345,791 | B2 | 3/2008 | Washio | |
| 7,463,387 | B2* | 12/2008 | Hagai et al. | 358/3.03 |
| 7,502,142 | B2* | 3/2009 | Watanabe | 358/3.1 |
| 7,570,392 | B2* | 8/2009 | Takahashi | 358/3.03 |
| 7,701,614 | B2* | 4/2010 | Yamazaki | 358/3.03 |
| 7,796,303 | B2* | 9/2010 | Kakutani | 358/3.13 |
| 7,869,095 | B2* | 1/2011 | Mantell | 358/3.22 |
| 8,004,721 | B2* | 8/2011 | Dittrich et al. | 358/3.21 |
| 2001/0012129 | A1* | 8/2001 | Inoue | 358/458 |
| 2002/0186417 | A1* | 12/2002 | Inoue | 358/3.14 |
| 2005/0195440 | A1 | 9/2005 | Inoue | |
| 2006/0244981 | A1 | 11/2006 | Li et al. | |
| 2007/0115508 | A1 | 5/2007 | Kashibuchi | |
| 2007/0154106 | A1 | 7/2007 | Koziarz | |
| 2007/0200908 | A1 | 8/2007 | Kin | |

FOREIGN PATENT DOCUMENTS

JP  2007129613  5/2007

OTHER PUBLICATIONS

Kitamura, Makoto, et al., "Efficient Inverse Haltoning of Ordered Dither Images Utilizing Matrix Addresses and Flat Area Detection", 1-4244-0549-1/06, IEEE Region 10 Conference TENCON, (2006), 4 pages.
Kite, Thomas D., et al., "A Fast, High-Quality Inverse Halftoning Algorithm for Error Diffused Halftones", 1057-7149/00, IEEE Transactions on Image Processing, vol. 9, No. 9, (Sep. 2000), 1583-1592.

* cited by examiner

Primary Examiner — King Poon
Assistant Examiner — Dung Tran
(74) Attorney, Agent, or Firm — Blakely, Sokoloff, Taylor & Zafman LLC.

(57) ABSTRACT

A printing system is disclosed. The printing system includes an image processor to rasterize a received print job and to perform a halftone by comparing a first threshold value from a threshold matrix to a first image component sample, comparing the first threshold value to a first number of sequential image component samples neighboring the first sample if the first threshold value is less than the first sample and comparing the first threshold value to a second number of sequential image component samples neighboring the first sample if the first threshold value is greater than or equal to the first sample.

20 Claims, 6 Drawing Sheets

| 180 | 190 | 114 | 58  | 90  | 132 | 238 | 215 | 182 | 192 | 113 | 63  | 88  | 129 | 235 | 214 |
| --- | --- | --- | --- | --- | --- | --- | --- | --- | --- | --- | --- | --- | --- | --- | --- |
| 77  | 122 | 188 | 144 | 196 | 225 | 137 | 110 | 76  | 121 | 188 | 146 | 197 | 229 | 139 | 108 |
| 20  | 73  | 169 | 249 | 253 | 200 | 101 | 53  | 18  | 75  | 165 | 241 | 253 | 198 | 98  | 49  |

Figure 4A

| 0 | 4 | 2 | 0 | 0  | 0 | -1 | 6 | 0 | 4 | 2 | 0 | 0  | 0 | 7 | 6 |
| - | - | - | - | -- | - | -- | - | - | - | - | - | -- | - | - | - |
| 0 | 0 | 1 | 0 | 0  | 7 | 3  | 1 | 0 | 0 | 1 | 0 | 0  | -1 | 3 | 1 |
| 0 | 0 | 0 | 0 | -1 | 5 | 3  | 1 | 0 | 0 | 0 | 0 | -1 | 5 | 3 | 1 |

Figure 4B

| 1 | 0 | 0 | -1 | 6 | 4 | 0 | 6 | 1  | 0 | 0 | 7 | 6 | 4 | 0 | 0 |
| - | - | - | -- | - | - | - | - | -- | - | - | - | - | - | - | - |
| 7 | 5 | 0 | 2  | 1 | 0 | 0 | 0 | -1 | 5 | 0 | 2 | 1 | 0 | 0 | 0 |
| 7 | 5 | 3 | 1  | 0 | 0 | 0 | 0 | -1 | 5 | 3 | 1 | 0 | 0 | 0 | 0 |

HALFTONE MECHANISM

FIELD OF THE INVENTION

The invention relates to the field of image reproduction, and in particular, to digital halftoning.

BACKGROUND

Halftoning is a process by which continuous-tone images are approximated by a pattern of pixels that can achieve only a limited number of discrete intensities. An example of this is the rendering of gray tones with black and white pixels, such as in a newspaper photograph. A halftone pattern is made up of a region of pixels referred to as a halftone cell. In conventional digital halftoning (e.g., halftoning that uses rational tangent angles), a halftone cell includes a specific, repeatable pattern. The tonal range of a halftone pattern depends upon the number of pixels in the halftone cell.

A halftone cell may cover only a small number of values (e.g., 16 values for a 4×4 cell). However, it may be necessary to include a higher range of values (e.g., 256). Thus, the halftone cell may be converted to a super cell by shifting the original cell by multiple constants to cover the desired range.

Pixels are typically arranged on an orthogonal grid, with the pixels placed at evenly spaced lattice points on an output device. A two dimensional array of pixels is often called a pixel map. Each pixel in the pixel map has its own unique address on the grid. An image processor within the output device uses this address to keep track of each pixel and its associated threshold value. A threshold value represents the tone value at which the pixel is turned "on." Each pixel within a super cell is assigned a threshold value.

Typically a threshold array (or matrix) is used to control the individual pixels in the super cell. The threshold matrix is replicated and "tiled" (i.e., filled in a non-overlapping manner) over the entire device space. Each pixel in the device space is then mapped to a particular element of the threshold matrix.

In order to determine whether a pixel is "on" or "off", the image processor checks a pixel's address, determines the tonal value of the image at that address, and compares the tonal value with the pixel's threshold value in the threshold matrix. If the tonal value exceeds the threshold value, the pixel is turned "on" when the image is created on the output device. Thus, the threshold matrix is accessed for every position for comparison with each input value to decide if the output should be on or off.

However as devices (e.g., printers, copiers, etc.) become faster, threshold processing for halftones need to be faster. One solution is to increase the processing power available to halftone. This solution, however, increases the cost of the devices since it is often necessary to add more processors and/or blades.

Accordingly, an improved mechanism to speed up halftone processing is desired.

SUMMARY

In one embodiment, a printing system is disclosed. The printing system includes an image processor to rasterize a received print job and to perform a halftone by comparing the first threshold value to a first number of sequential image component samples neighboring the first sample if the first threshold value is less than the first sample and comparing the first threshold value to a second number of sequential image component samples neighboring the first sample if the first threshold value is greater than or equal to the first sample.

In another embodiment, a method is disclosed. The method includes comparing a first threshold value from a threshold matrix to a first image component sample, comparing the first threshold value to a first number of sequential image component samples neighboring the first sample if the first threshold value is less than the first sample and comparing the first threshold value to a second number of sequential image component samples neighboring the first sample if the first threshold value is greater than or equal to the first sample.

BRIEF DESCRIPTION OF THE DRAWINGS

A better understanding of the present invention can be obtained from the following detailed description in conjunction with the following drawings, in which.

DETAILED DESCRIPTION

A halftone processing mechanism is described. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
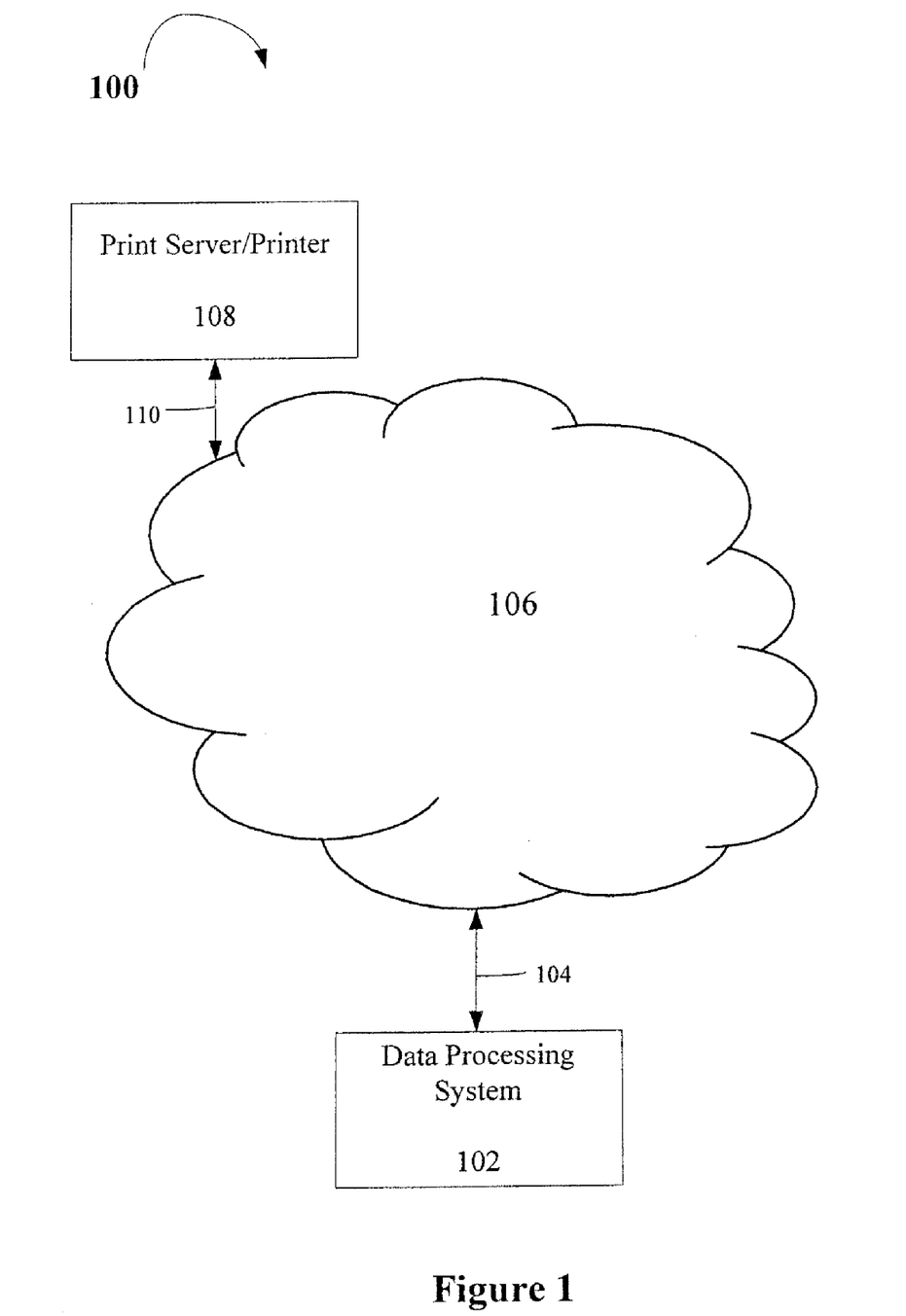
FIG. 1 illustrates one embodiment of a data processing system network.

FIG. 1 illustrates one embodiment of a data processing system network 100. Network 100 includes a data processing system 102, which may be either a desktop or a mobile data processing system, coupled via communications link 104 to network 106. In one embodiment, data processing system 102 is a conventional data processing system including a processor, local memory, nonvolatile storage, and input/output devices such as a keyboard, mouse, trackball, and the like, all in accordance with the known art. Data processing system 102 in accordance with the present invention preferably includes and employs the Linux operating system or a similar operating system and/or network drivers permitting data processing system 102 to communicate with network 106 for the purposes of employing resources within network 106.

Network 106 may be a local area network (LAN) or any other network over which print requests may be submitted to a remote printer or print server. Communications link 104 may be in the form of a network adapter, docking station, or the like, and supports communications between data processing system 102 and network 106 employing a network communications protocol such as Ethernet, the AS/400 Network, or the like.

According to one embodiment, network 106 includes a print server/printer 108 serving print requests over network 106 received via communications link 110 between print server/printer 108 and network 106. The operating system on data processing system 102 is capable of selecting print server/printer 108 and submitting requests for services to print server/printer 108 over network 106. Print server/printer 108 includes a print queue for print jobs requested by remote data processing systems.

The data processing system network 100 depicted in FIG. 1 is selected for the purposes of explaining and illustrating the present invention and is not intended to imply architectural limitations. Those skilled in the art will recognize that various additional components may be utilized in conjunction with the present invention.

Figure 2:
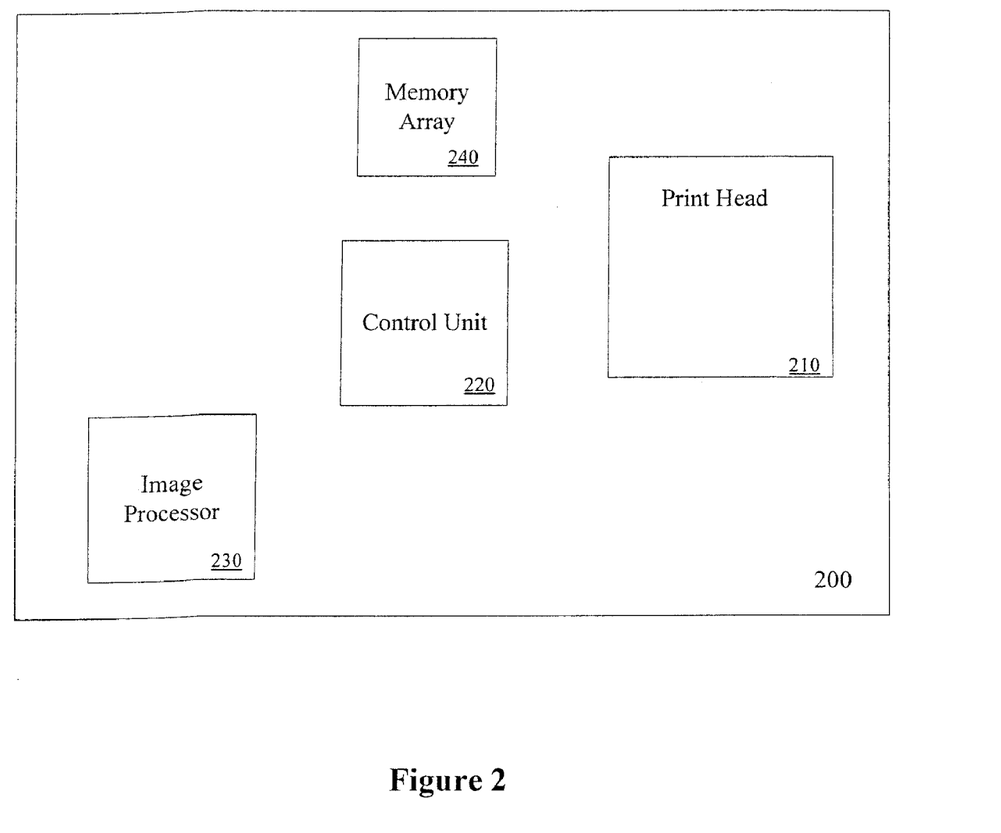
FIG. 2 illustrates one embodiment of a printer.

FIG. 2 illustrates one embodiment of a printer 200. In one embodiment, printer 200 is implemented as the printing component of print server/printer 108. Printer 200 includes a print head 210, control unit 220, image processor 230 and memory array 240.

Print head 210 includes a printing element that prints to a print medium. In one embodiment, print head 210 is an inkjet print head including nozzles that are implemented to spray droplets of ink onto a sheet of paper in order to execute a print job. Control unit 220 controls the operation of print head 210.

Image processor 230 performs rasterization of image data received at printer 200. Rasterization converts vector information received at printer 200 into a raster format. Particularly, image processor 230 generates a raster scan of a received image that is to be stored as scan line data in memory array 240. Subsequently, image processor 230 performs halftone processing of the scan line data stored in memory array 240.

According to one embodiment, image processor 230 performs a halftone process that speeds up halftone processing in order to provide a faster output without increasing the processing power (i.e. less cost) such as for the IP4100. In such an embodiment, the process detects whether the output is off. Subsequently, the most recently used threshold is compared to the next N (from an "off" matrix) image values along the scan line. As long as the image pels are less than the just used threshold, the output remains off. However, if the output in "on", the most recently used threshold is compared to the next M (from an "on" matrix) image values to see how long the output is "on".

Figure 3:
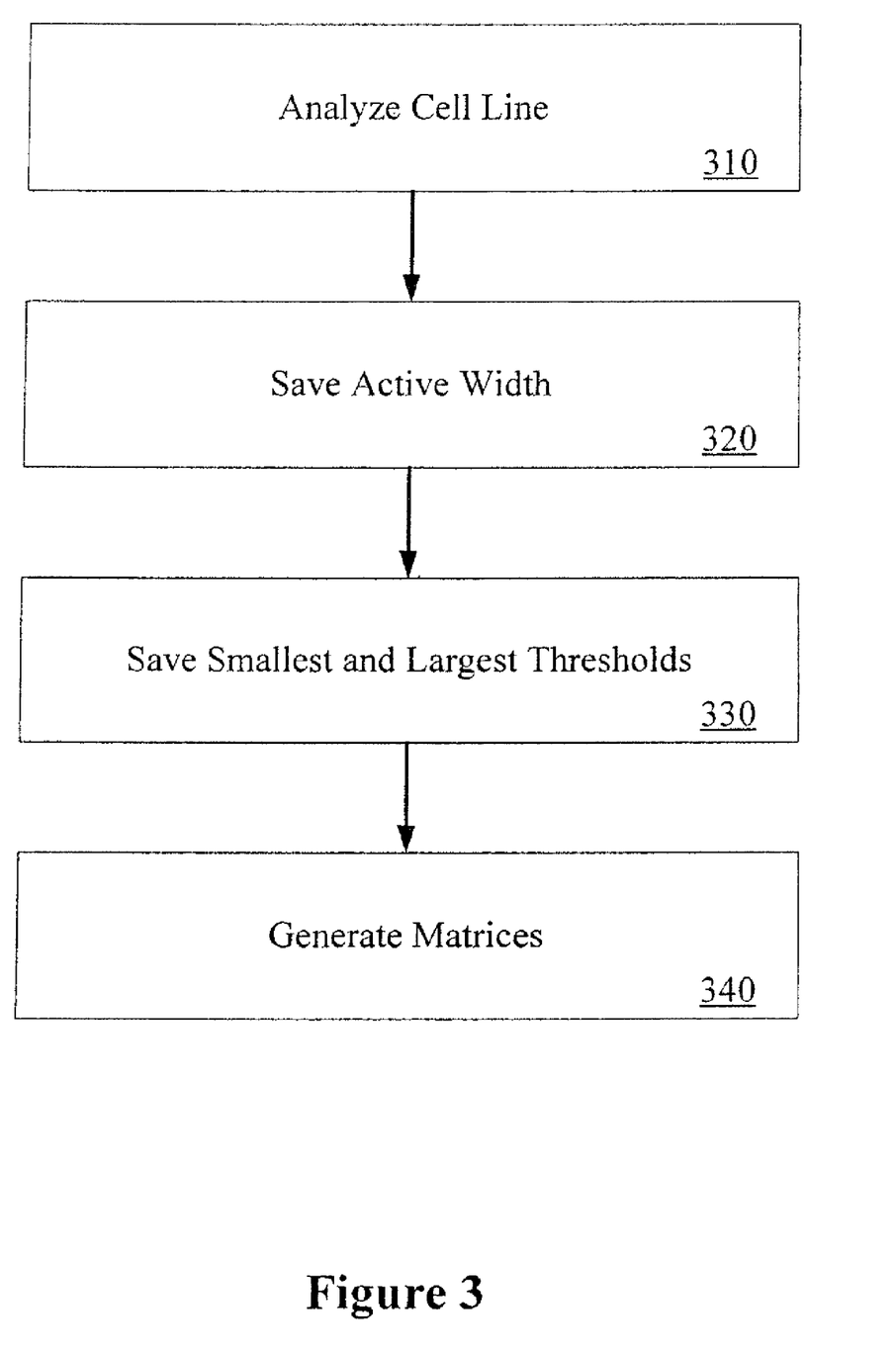
FIG. 3 is a flow diagram illustrating one embodiment of halftone processing.

FIG. 3 is a flow diagram illustrating one embodiment of a preliminary halftone process that occurs before an output device (e.g., printer 200) is placed online for operation. At processing block 310, each cell in a halftone super cell is analyzed to determine a minimum repetition for the super cell since the super cell may have a pattern of threshold values replicated an integer number of times.

At processing block 320, a width of the unique pattern is saved for each line of the threshold matrix. Since the threshold matrix may have repetitive patterns, the unique pattern width represents an actual width of one or more unique patterns on a line. According to one embodiment, the threshold matrix is only accessed for the saved unique pattern values in each line. Thus, there is no need to access the threshold matrix for repetitive pattern values, thereby reducing the number of accesses to the threshold matrix.

At processing block 330, the smallest and largest thresholds for each super cell line is saved. According to one embodiment, there is no need to check the threshold matrix if there are pixels on the super cell line below the smallest threshold since they are known to be white. Similarly, there is no need to check the threshold matrix if there are pixels that are greater or equal to the largest threshold on that line, since they will be black. Accordingly, they all go to "on".

In a further embodiment, it is confirmed once per image that an input maximum value always has a constant output (e.g. black or "on") and that the minimum input (e.g., zero) is the minimum output (e.g., "off"). At processing block 340, parallel matrices are generated and stored at memory array 220. In one embodiment, an "off" matrix includes a number (M), for each threshold position, of neighboring future threshold values along the print or (scan) direction that are greater than or equal to the current threshold, while an "on" matrix includes a number (N), for each threshold position, of neighboring future thresholds along the scan direction that are smaller than the current threshold.

According to one embodiment, the "off" matrix is used if the threshold matrix outputs minimum output (e.g., no printing) at that point and the "on" matrix is used if the threshold matrix outputs maximum printing (e.g., printing). In such an embodiment, values that are less than the threshold matrix are print off and the values greater than or equal to the on matrix result in printing.

Once the above-described process has been completed, printer 200 is ready for operation. After performing rasterization, image processor 230 initiates the halftone process by comparing thresholds. In one embodiment, a current threshold value is compared to image samples for up to the next M positions in the "off" matrix if the current position threshold indicates that it is "off". As long as the image sample input is less than the current threshold, the output continues to be off.

When the input is no longer less than the threshold value, or M comparisons have been made, the real threshold value from the position in the threshold matrix corresponding to the position in the "off" matrix that failed the less than condition is used as the new current position. In one embodiment, the "off" distance can be used for a new M distance. However, in other embodiments several thresholds can be tested looking for an "on" threshold result.

When the threshold value in the threshold matrix goes "on", the previous threshold value is compared to image samples for up to N future neighbors in the "on" matrix, rather than accessing their new threshold values. As long as they are greater than or equal to the previous threshold value, the result is the same as individually thresholding the samples. Based on the "on" or "off" conclusion, the "on" or "off" matrix is used to look up the number of neighbor threshold values that will provide the same answer as the current threshold.

Figure 4A:
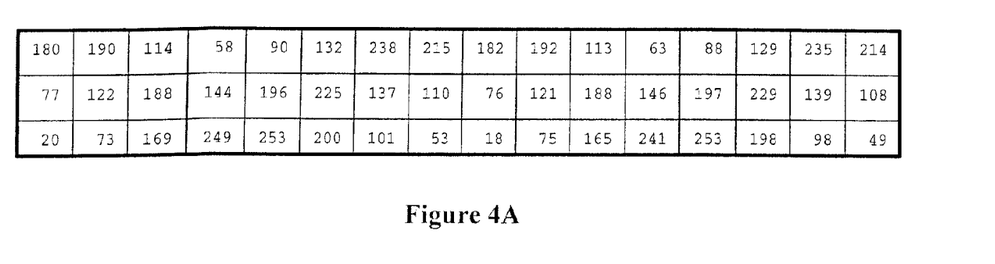
FIG. 4A, illustrates one embodiment of a super cell.
Figure 4B:
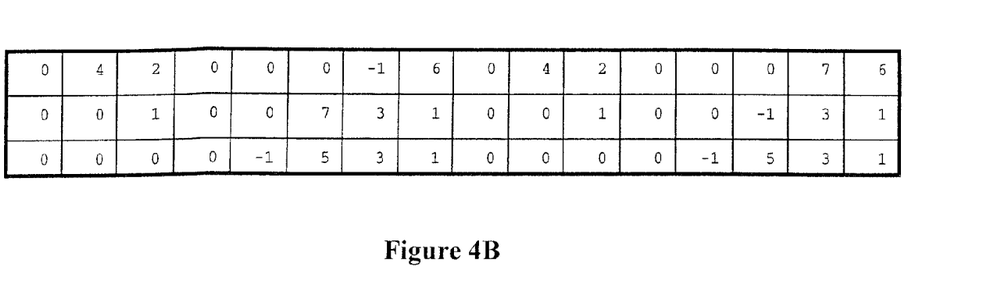
FIGS. 4B and 4C illustrate embodiments of on and off arrays.
Figure 4C:
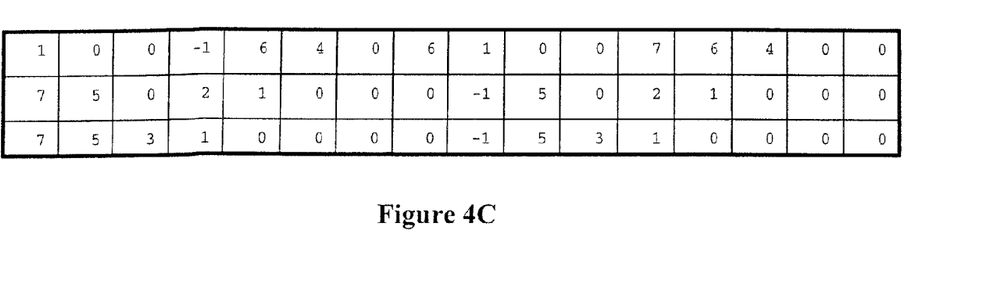

FIG. 4A, illustrates three lines of one embodiment of a sixteen pixel super cell, while FIGS. 4B and 4C illustrate embodiments of "on" and "off" arrays. In the "off" array, −1 indicates the largest threshold on a line, while −1 in the "on" array indicates the smallest threshold on a line. As discussed above, these values are determined before printer 200 is placed into operation.

The minimum/maximum should be tested once per line during operation before comparing the one by one thresholds to the image sample values. Further, if one array is non-zero the same position in the other array must be zero since if neighbor to the right is greater than or equal to a value, then it cannot be less than the value, and vice versa.

Figure 5:
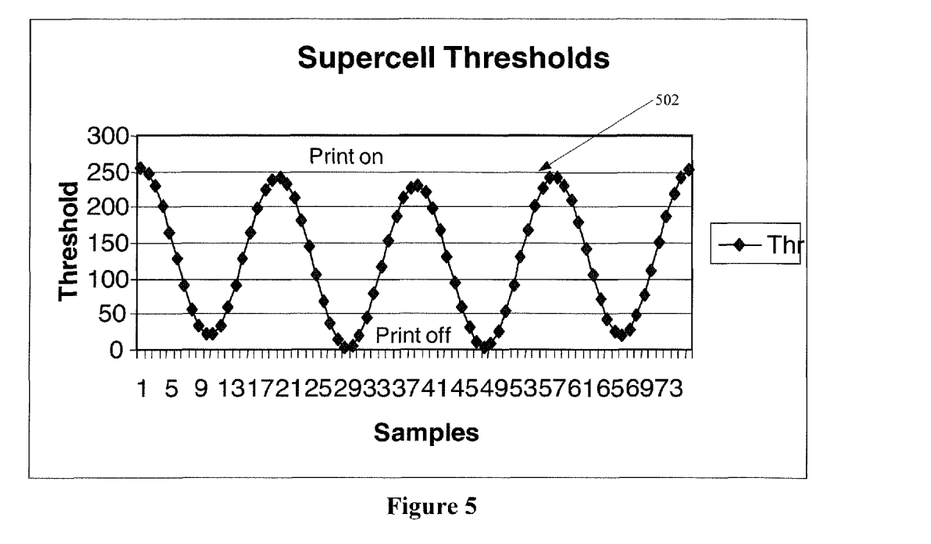
FIGS. 5-8 are graphs illustrating embodiments of threshold values.
Figure 6:
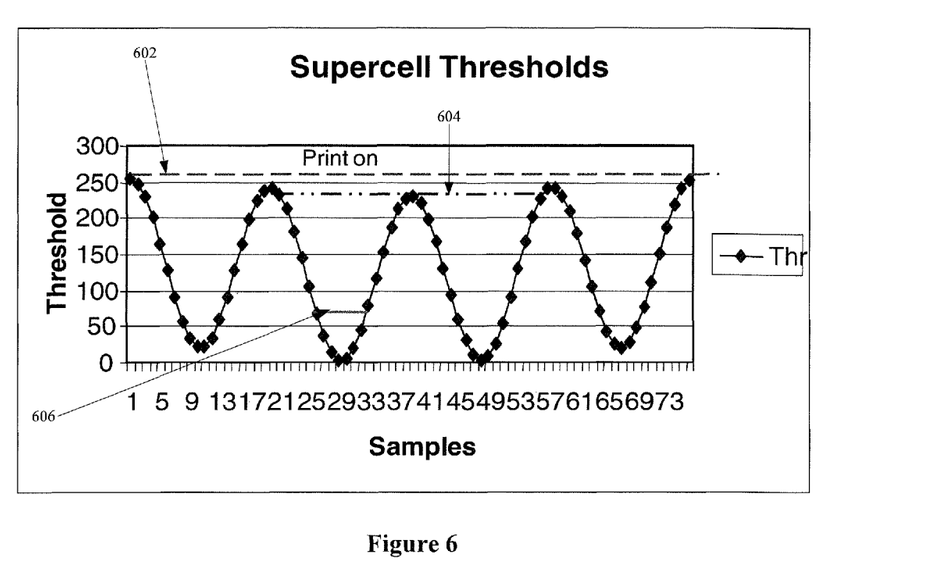

FIGS. 5-8 illustrate graphs for embodiments of threshold values. FIGS. 5 illustrates the threshold values (created using two cosines) where the print will be "on" if the input is above or on line 502 and off it below line 502. FIGS. 6 illustrates the threshold values for instances for a distance to the next threshold less than the current threshold for use following a print "on". The line 602 shows where the maximum threshold falls, while the line 604 shows two cycles to hit a threshold below it. Meanwhile, the line 606 shows a distance less than a cycle.

Figure 7:
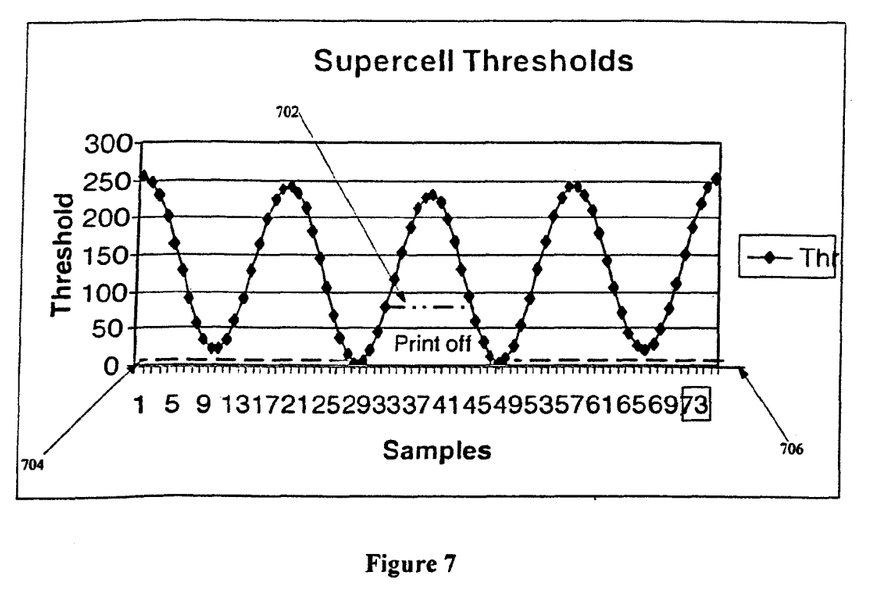
Figure 8:
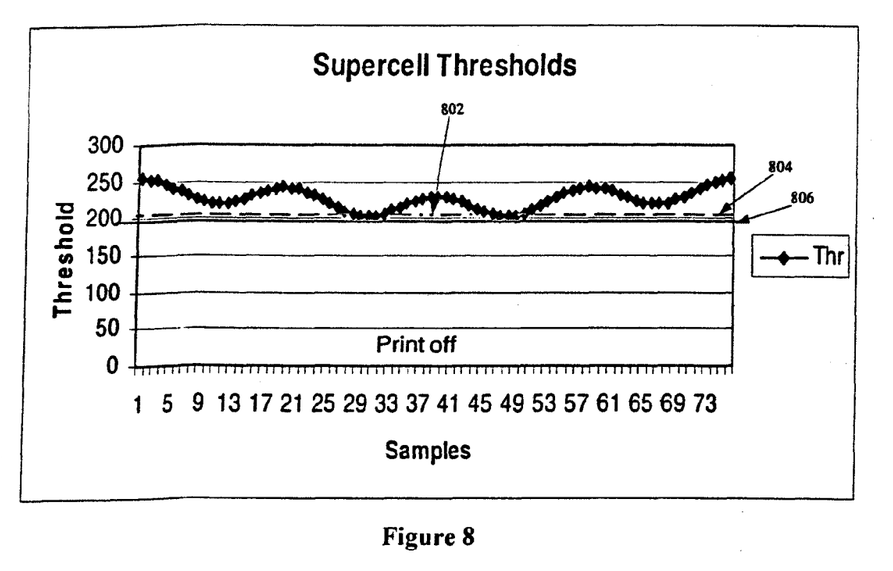

FIG. 7 shows the minimum threshold at line 706. The line 704 wraps around for a total of three cycles, and the line 702 is less than one cycle. FIG. 8 shows a simulation of the same matrix for a scan line toward a darker part.

According to one embodiment, error diffusion may occur. Error diffusion is characterized by single dots of "on" or "off" in a region of the opposite. These effects may be simulated by stochastic super cells. Therefore, the above-described process may be used in sparse light areas if it is known that a printed dot is most likely to be followed by P."off" dots. Similarly in the dark areas, the reverse happens. After an "off" print value, the next new few values should be "on". This makes it possible to use this same technique except for expecting the opposite to follow rather than more of the same.

The above-described mechanism increases halftone processing efficiency by eliminating the need for an image processor to fetch threshold values for every image component sample value in a threshold matrix.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A method comprising:
    a processor comparing a first threshold value from a threshold matrix to a first image component sample;
    a processor comparing the first threshold value to a first number of sequential image component samples neighboring the first image component sample if the first threshold value is less than the first sample; and
    a processor comparing the first threshold value to a second number of sequential image component samples neighboring the first image component sample if the first threshold value is greater than or equal to the first sample.

2. The method of claim 1 wherein the first number is provided in a first matrix and the second number is provided in a second matrix.

3. The method of claim 2 further comprising maintaining a print off output value while the first number of sequential image component samples are less than the first threshold value.

4. The method of claim 3 further comprising comparing a second threshold value from the threshold matrix to a second image component sample if it is determined that one of the first number of sequential image component samples is greater than the first threshold value.

5. The method of claim 3 further comprising comparing a second threshold value from the threshold matrix to a second image component sample once the first threshold value have been compared to each of the first number of sequential image samples.

6. The method of claim 2 further comprising maintaining a print on output value while the second number of sequential image component samples are greater than or equal to the first threshold value.

7. The method of claim 6 further comprising comparing a second threshold value from the threshold matrix to a second image component sample if it is determined that one of the second number of sequential image component samples is less than the first threshold value.

8. The method of claim 6 further comprising comparing a second threshold value from the threshold matrix to a second image component sample once the first threshold value have been compared to each of the second number of sequential image samples.

9. The method of claim 2 further comprising:
    generating the first matrix by including a plurality of neighboring threshold values for each threshold position in a halftone super cell that are greater than or equal to a current threshold position in a threshold matrix; and
    generating the second matrix by including a plurality of neighboring threshold values for each threshold position in the halftone super cell that are less than the current threshold position in the threshold matrix.

10. The method of claim 9 further comprising analyzing each cell in a halftone super cell prior to generating the first matrix to determine a minimum repetition for the super cell.

11. The method of claim 10 further comprising saving active unique pattern width for each line in the threshold matrix.

12. A printing system comprising:
    an image processor to rasterize a received print job and to perform a halftone by comparing a first threshold value from a threshold matrix to a first image component sample, comparing the first threshold value to a first number of sequential image component samples neighboring the first sample if the first threshold value is less than the first image component sample and comparing the first threshold value to a second number of sequential image component samples neighboring the first image component sample if the first threshold value is greater than or equal to the first sample.

13. The printing system of claim 12 wherein the first number is provided in a first matrix and the second number is provided in a second matrix.

14. The printing system of claim 13 wherein the image processor maintains a print off output value while the first number of sequential image component samples are less than the first threshold value and maintains a print on output value while the second number of sequential image component samples are greater than or equal to the first threshold value.

15. The printing system of claim 14 wherein the image processor further generates the first matrix including a plurality of neighboring threshold values for each threshold position in a halftone cell that are greater than or equal to a current threshold position in the threshold matrix and generates the second matrix including a plurality of neighboring threshold values for each threshold position in the halftone cell that are less than the current threshold position in the threshold matrix.

16. An article of manufacture comprising a non-transitory machine-readable medium including data that, when accessed by a machine, cause the machine to perform operations comprising:
   comparing a first threshold value from a threshold matrix to a first image component sample;
   comparing the first threshold value to a first number of sequential image component samples neighboring the first sample if the first threshold value is less than the first image component sample; and
      comparing the first threshold value to a second number of sequential image component samples neighboring the first image component sample if the first threshold value is greater than or equal to the first sample.

17. The article of manufacture of claim 16 wherein the first number is provided in a first matrix and the second number is provided in a second matrix.

18. The article of manufacture of claim 17 wherein the machine-accessible medium include data that cause the machine to perform further operations comprising:
   maintaining a print off output value while the first number of sequential image component samples are less than the first threshold value; and
   maintaining a print on output value while the second number of sequential image component samples are greater than or equal to the first threshold value.

19. The article of manufacture of claim 18 wherein the machine-accessible medium include data that cause the machine to perform further operations comprising:
   generating the first matrix by including a plurality of neighboring threshold values for each threshold position in a halftone super cell that are greater than or equal to a current threshold position in a threshold matrix; and
   generating the second matrix by including a plurality of neighboring threshold values for each threshold position in the halftone super cell that are less than the current threshold position in the threshold matrix.

20. The article of manufacture of claim 19 wherein the machine-accessible medium include data that cause the machine to perform further operations comprising analyzing each cell in a halftone super cell prior to generating the first matrix and the second matrix to determine a minimum repetition for the super cell.

* * * * *